United States Patent [19]

O'Neill

[11] Patent Number: 4,545,366

[45] Date of Patent: Oct. 8, 1985

[54] BI-FOCUSSED SOLAR ENERGY CONCENTRATOR

[75] Inventor: Mark J. O'Neill, Richardson, Tex.

[73] Assignee: Entech, Inc., Tex.

[21] Appl. No.: 653,147

[22] Filed: Sep. 24, 1984

[51] Int. Cl.[4] .............................................. F24J 3/02
[52] U.S. Cl. ................... 126/440; 136/246; 350/452; 126/417; 126/452
[58] Field of Search ....... 126/440, 417, 452; 136/246; 350/451, 452, 417, 433, 436, 557, 501, 167

[56] References Cited

U.S. PATENT DOCUMENTS

| | | | |
|---|---|---|---|
| 593,045 | 11/1897 | Cummings | 126/440 X |
| 3,915,148 | 10/1975 | Fletcher et al. | 126/440 X |
| 3,991,741 | 11/1976 | Northrup, Jr. et al. | 126/440 X |
| 4,069,812 | 1/1978 | O'Neill | 126/440 X |
| 4,116,223 | 9/1978 | Vasilantone | 126/440 X |
| 4,299,201 | 11/1981 | Tsubota | 126/440 |

FOREIGN PATENT DOCUMENTS 51932  5/1982  European Pat. Off. ............ 126/440

Primary Examiner—Larry Jones
Attorney, Agent, or Firm—Harold E. Meier

[57] ABSTRACT

A refractive optical concentrator for focussing solar energy on to small focal spots includes a linear Fresnel lens optically cross-coupled with simple cylindrical lenses. The cross-coupled lens concentrator comprises an optically clear dielectric material, such as acrylic plastic, with a plurality of linear prisms formed on its inner surface, and a plurality of perpendicularly mounted cylindrical lenses formed on its outer surface, such that the cylindrical lenses focus the sunlight toward a series of lateral axes and the prisms re-focus the sunlight along a longitudinal axis. The bi-focussed radiant energy is thereby concentrated upon a series of photovoltaic cells for transforming sunlight into electrical energy.

18 Claims, 2 Drawing Figures

BI-FOCUSSED SOLAR ENERGY CONCENTRATOR

FIELD OF THE INVENTION

The present invention relates generally to solar energy concentrators and more specifically to a concentrating lens and solar energy concentrator for focussing incident radiant energy on to incremental focal spots on the surface of a receiver.

BACKGROUND OF THE INVENTION

Solar energy collection systems which utilize optical concentrators to focus incident sunlight on to small energy receivers offer many cost and performance advantages over flat-plate solar energy collectors. In heat collector applications, the energy receiver area loses heat to the environment by radiation, convection and conduction. Accordingly, receivers with smaller receiver areas would have smaller heat losses and operate more efficiently. In photovoltaic collector applications, such focussing collectors would also utilize much smaller quantities of expensive semiconductor materials such as silicon, due to the smaller receiver area. One particularly effective solar concentrator is the linear Fresnel lens system of U.S. Pat. No. 4,069,812. That collector system has been developed to provide efficient collection of heat, photovoltaic electricity, and a combination of both. However, due to the basic physics of linear Fresnel lens concentrators, the concentration ratio, which is defined as the lens aperture area divided by the illuminated receiver area, is practically limited to values between 25 and 50. It is highly desirable to provide higher concentration ratios of 100 to 200. Higher concentration ratios would allow the same radiant energy to be collected, for example, in a photovoltaic application, but would require significantly smaller solar photovoltaic cells thereby substantially reducing the cost of the system.

SUMMARY OF THE INVENTION

It is accordingly an object of the present invention to provide a more effective solar energy concentrator which can provide higher concentration ratios than conventional linear Fresnel lenses.

It is another object of the present invention to optically combine a linear Fresnel lens with a series of cylindrical lens elements to provide a cross-coupled optical concentrator which produces a series of focal spots at a receiver axis.

It is yet another object of the present invention to provide a more cost effective photovoltaic energy conversion system by using a cross-coupled dual lens system in combination with smaller photovoltaic cells.

In accomplishing these and other objects, there has been provided, in accordance with the present invention, a refractive optical concentrator for focussing solar energy. The concentrator comprises a plurality of linear prisms on its inner surface, such prisms forming a linear Fresnel lens, and a plurality of cylindrical lens elements on the outer surface such that the concentrator forms a series of colinear focal spots at a receiver axis. The cross-coupled lens system thereby focusses incident sunlight along a longitudinal axis with the linear Fresnel lens prisms on its inner surface, and along a series of perpendicular lateral axes with the cylindrical lens elements on its outer surface. By focussing the incident sunlight in two directions, spot-focussing can be accomplished and higher overall concentration ratios can be achieved than would be possible with conventional linear Fresnel lenses.

BRIEF DESCRIPTION OF THE DRAWINGS

A better understanding of the present invention may be had from the following detailed description, when read in connection with the accompanying drawings in which.

DETAILED DESCRIPTION OF THE PREFERRED EMBODIMENT

Figure 1:
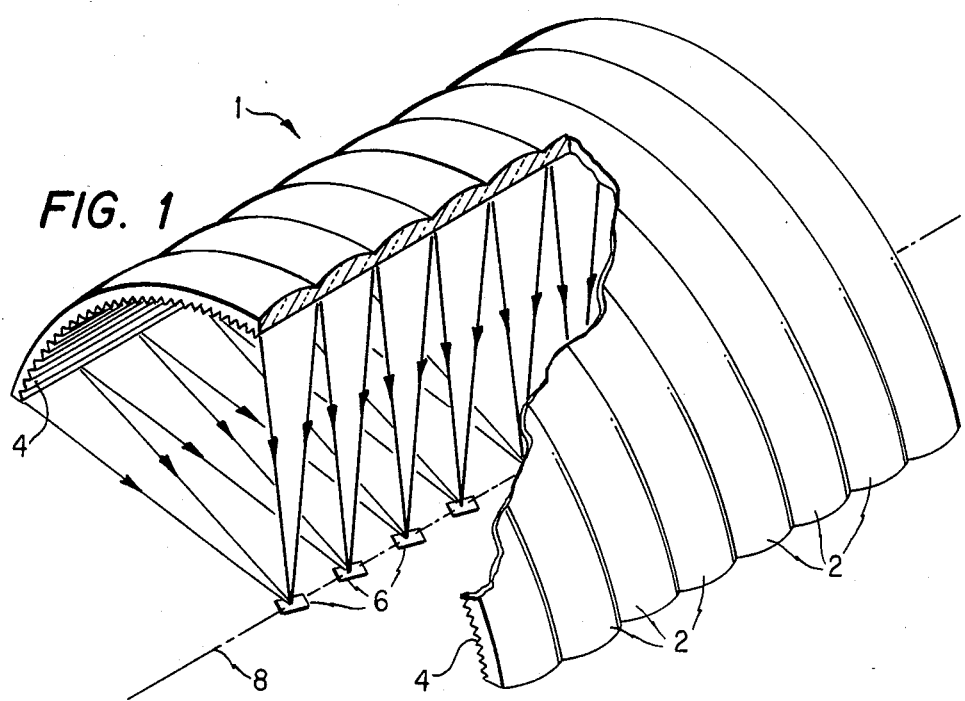
FIG. 1 shows a perspective cut-away view of a preferred embodiment of the cross-coupled bi-focussing lens system of the present invention.

Referring to FIG. 1. in detail, there is shown a cross-coupled lens structure 1 and photovoltaic elements 6. The elements 6 are arranged to be electrically connected together and the lens structure 1 is designed to be placed within the aperture of a solar energy housing such as shown in U.S. Pat. No. 4,069,812. The lens structure 1 includes a series of cylindrical lens elements 2 mounted adjacently to each other along the length of the lens structure 1. The inner surface of the lens structure 1 is comprised of a plurality of linear prisms 4 mounted adjacently to each other in a direction perpendicular to the axes of the cylindrical lenses 2 and running parallel to the longitudinal receiver axis 8 of the collector. The cross-coupled lens structure 1 is arranged to focus incident energy upon a series of discrete photovoltaic cell elements 6. Without the cylindrical lens elements 2, incident sunlight would be refracted by the Fresnel lens prisms 4 and focussed along a longitudinal axis 8 located at the focal axis of the fresnel lens as shown in U.S. Pat. No. 4,069,812. While that construction is very efficient, it requires a continuous photovoltaic surface along the axis 8 in order to maximize the energy output from the energy focused thereon by the Fresnel lens elements 4. That process is relatively expensive because of the relatively high costs of the silicon elements generally used in converting radiant energy into electrical energy. Through the implementation of the cross-coupled cylindrical lens elements 2 superimposed upon the Fresnel lens 4, the energy incident upon the top of the lens structure 1 is focused in two directions such that the cylindrical lens elements 2 converge light toward incremental silicon cell elements 6 while the linear prisms 4 further focus the converging radiant energy along the receiving axis 8 thereby enabling the use of discrete silicon cells 6 instead of continuous row of cells. Accordingly less overall silicon is required and the cost of the system is significantly reduced while the overall efficiency or energy output from the system is not significantly reduced.

Figure 2:
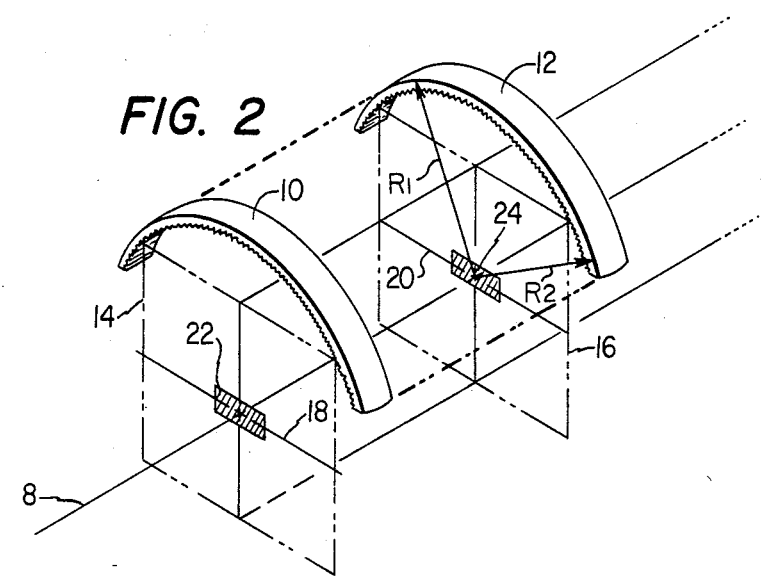
FIG. 2 illustrates certain operational aspects of the lens system.

In FIG. 2, two of the cylindrical elements 10 and 12 are shown in detail together with associated lateral focal planes 14 and 16, respectively. The cylindrical elements 10 and 12 are designed to focus incident radiation generally along lateral axes 18 and 20, respectively. The lateral curvature of the cylindrical elements together with the Fresnel lens prisms 4 determine the lateral width of the focal spots 22 and 24 which are formed along the longitudinal axis 8, while the radius of curvature of the cylindrical elements 10 and 12 determine the length of the focal spots 22 and 24, respectively, along the longitudinal axis 8. The system is designed to maximize the concentration ratio and match the size of the focal spots to the size of the photovoltaic elements 6.

OPERATION

For the optimized lens described in U.S. Pat. No. 4,069,812, the maximum practical concentration ratio, defined as a lens aperture area divided by the illuminated receiver area, is about 25 to 50. Higher values are not practical because of the combined effects of the finite size of the sun and the dispersion of the various spectral components of incident solar radiation by the lens material. For many solar energy applications, it is desirable to achieve higher concentration ratios. For example, in photovoltaic cell conversion systems, the cell usually represents the most costly component of the system, even when used with a linear Fresnel lens with a concentration ratio of about 40. The cell cost contribution could be reduced by 75% if a concentration ratio of 160 were achievable instead of 40, since the cell area needed in the system is inversely proportional to the concentration ratio. The invention described herein allows the concentration ratio to be increased to 160 or higher, with substantial economic savings for solar energy conversion systems.

By providing bi-directional focussing, the cross-coupled lens structure 1 refracts incident sunlight forming the convergent light rays which focus onto a series of colinear focal spots along the receiver axis 8 upon which are mounted the photovoltaic cells 6. An infinite variety of possible cross-coupled lens designs may be configured by varying, singly or in combination, the basic prismatic linear Fresnel lens design, the basic cylindrical lens element design, and the size, shape, and configuration of the cross-coupled lens.

The preferred embodiment of the cross-coupled lens 1 consists of a single piece of optically clear material such as acrylic plastic, with the prismatic geometry molded in the inner surface of the material and with the cylindrical lens pattern molded into the outer surface of the material. The structure can be accomplished by compression molding of acrylic plastic or similiar materials. An alternate method of making the cross-coupled lens is to individually extrude one sheet of acrylic plastic with the prismatic structure on one surface of the sheet, and to individually extrude a second sheet of acrylic plastic with the cylindrical lens pattern on one surface of that sheet. The two sheets of acrylic plastic can then be solvent laminated perpendicularly to one another to form the single piece cross-coupled lens structure 1 shown in the figure. In either case, it is desirable to produce a single-piece construction cross-coupled lens.

A typical size for the cross-coupled lens would be approximately twenty inches across the aperture with each cylindrical element 2 approximately two inches wide. Each element would then provide a lens aperture area of forty square inches. Optical analysis and prototype tests have shown that such a lens can easily focus incident sunlight to a focal spot smaller than 0.5 inch×0.5 inch square. Thus 40 square inches of sunlight-collecting area can be focussed into a 0.25 square inch focal spot, for a concentration ratio of 160. A complete cross-coupled lens could be approximately 120 inches long, made up of about 60 of the cylindrical lens elements along this length. This preferred embodiment uses the transmittance-optimized linear Fresnel lens design of U.S. Pat. No. 4,069.812 combined with ciruclar cylindrical lens elements with a radius of curvature appropriately selected to provide the best possible focussing upon the elements 6. The design and optimization of such a cross-coupled lens is most easily done with a ray-trace computer program, which traces individual rays of various wavelengths from various parts of the sun through the lens and on to the focal spots. By varying the design of the prisms and/or the cylindrical elements, the radiant energy distributions in the focal spot can be tailored for various applications.

A preferred embodiment of the cross-coupled lens involves its use in with small photovoltaic cells placed at each of the focal spots. These individual photovoltaic cells produce electricity directly from the concentrated sunlight. The cross-coupled lens allows the concentration ratio to be very high thereby maximizing the efficiency and minimizing the cost of the cells.

Another advantageous feature of the cross-coupled lens is its smooth outer surface, which can be easily cleaned by rain or by washing with water and mild detergent. Another feature of the cross-coupled lens is its ability to be manufactured in flat form, and then manipulated into the desired arched shape. Flat lens manufacture is generally easier and more economical than arched lens manufacture. The final arched lens shape is desirable from both optical and mechanical considerations. As shown in U.S. Pat. No. 4,069,812, an arched Fresnel lens is more efficient than a flat Fresnel lens and is structurally superior to a flat lens. Thus a preferred embodiment of the present invention would be implemented through a cross-coupled lens which is arched in order to maximize the efficiency of the concentrator, although the flat lens could be used for applications not requiring high efficiencies.

The cylindrical lens elements 2 can be of constant radius of curvature or varying radius of curvature e.g., see element 12 in FIG. 2 having unequal radii $R_1$ and $R_2$, depending upon the desired focal spot radiant energy distribution. By varying the radius curvature of the elements 2 from the center of the Fresnel lens to the edge of the Fresnel lens, higher concentration ratios can be obtained. However, such a varying radius of curvature geometry will probably be more expensive than a constant radius of curvature, since the latter can be made by extrusion of acrylic plastic or other materials. The optimal shape of the cylindrical elements 2 will therefore depend upon the specific application of the cross-coupled lens concentrator.

While the cross-coupled lens configuration shown in the figure represents the preferred embodiment of the invention, other configurations, utilizing various Fresnel lens designs on the inner surface and various cylindrical lens elements designs on the outer surface, and using other sizes, shapes, materials, and energy receiving means at the focal spots, will be apparent to those skilled in the art after review on the basic cross-coupled lens concept of the presnet invention.

The embodiments of the present invention in which an exclusive property or privilege is claimed are defined as follows:

1. A lens system for focussing radiant energy on an energy receiving means arranged along a longitudinal axis, said lens system comprising:
   first concentrator means comprising a plurality of cylindrical lens elements mounted adjacent to each other in a direction perpendicular to the longitudinal axis of said energy receiving means, said elements serving to receive incident radiant energy and initially focussing the incident energy in a first manner; and second concentrator means comprising a Fresnel lens optically coupled to said plurality of cylindrical lens elements and being operable to re-focus said initially focussed radiant energy to form discrete focal spots on the energy receiving means.

2. The lens system as set forth in claim 1 wherein said first and second concentrator means comprise discrete first and second lens devices.

3. The lens system as set forth in claim 2 wherein said discrete first and second lens devices each include a substantially smooth surface, said first and second lens devices being bonded together at said smooth surfaces.

4. The lens system as set forth in claim 1 wherein said first and second concentrator means are formed on first and second surfaces of a single layer of refractive material.

5. The lens system as set forth in claim 4 wherein said first concentrator means comprises the plurality of cylindrical lens elements on the outer surface of said refractive material, said lens elements being arranged to receive incident radiant energy, and said Fresnel lens comprises a plurality of refractive linear prisms on the inner surface of said refractive material.

6. The lens system as set forth in claim 5 wherein said prisms are oriented in a direction substantially perpendicular to said cylindrical lens elements.

7. The lens system as set forth in claim 4 wherein the radius of curvature from any focal spot to the center of said single layer of refractive material varies across the width of the refractive material.

8. The lens system as set forth in claim 1 wherein said first and second concentrator means form an arch, said cylindrical lens elements being arranged across the arch.

9. The lens system as set forth in claim 1 wherein the system further includes photovoltaic cells placed at each focal spot, said photovoltaic cells being operable to convert the re-focussed radiant energy into electrical energy.

10. The lens system as set forth in claim 1 and further including heat receiving means placed at each focal spot to convert the re-focussed radiant energy into thermal energy.

11. The lens system as set forth in claim 1 wherein said cylindrical lens means has a constant radius of curvature.

12. The lens system as set forth in claim 1 wherein at least one of said cylindrical lens elements has a varying radius of curvature.

13. The lens system as set forth in claim 1 wherein said Fresnel lens is formed such that the angle at which incident radiant energy impinges upon said Fresnel lens is substantially equal to the angle at which the refracted radiant energy exits said Fresnel lens.

14. The lens systems as set forth in claim 1 wherein said first and second concentrator means comprise a laminated assembly consisting of an outer lens structure defining the first concentrator means and an inner lens structure comprising the Fresnel lens, said inner and outer lens structures being bonded together to form the laminated assembly.

15. A cross-coupled lens concentrator for focussing solar energy on a receiver arranged along a longitudinal axis, said lens concentrator comprising an inner surface of refractive linear prisms forming a linear Fresnel lens, and an outer surface of cylindrical lens elements, said lens elements arranged substantially perpendicularly to the said prisms and said longitudinal axis of said receiver, such that the Fresnel lens provides longitudinal concentration of the solar energy along the longitudinal axis of the receiver and the cylindrical lens elements provide lateral concentration of the solar energy along axes perpendicular to the longitudinal axis of the receiver, thereby forming discrete focal spots on the longitudinal axis of the receiver.

16. A method of focussing solar energy into a series of focal spots, the method comprising the steps of:

initially focussing the solar energy, by means of substantially cylindrical lenses, along a series of lateral axes at a receiver means; and re-focussing the solar energy, by means of a prismatic linear Fresnel lens, along the main receiver axis which is substantially perpendicular to the lateral axes.

17. A solar energy collector comprising cylindrical lens elements each arranged to focus solar energy along a plane perpendicular to a longitudinal axis of the collector, a prismatic linear Fresnel lens arranged to focus incident solar energy along the longitudinal axis thereby forming discrete focal spots on the longitudinal axis, and energy receiving means located at said discrete focal spots.

18. The lens system as set forth in claim 17 wherein said energy receiving means comprises a series of photovoltaic solar cells operable to convert the focussed sunlight into electricity.

* * * * *